July 31, 1923.
C. F. SCHWENNKER
1,463,488
PACKING
Filed Dec. 16, 1921
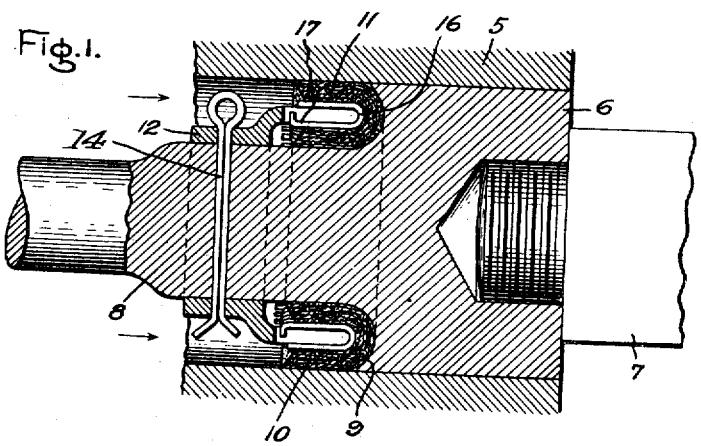
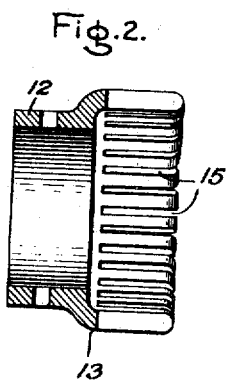
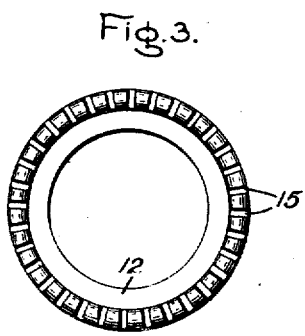
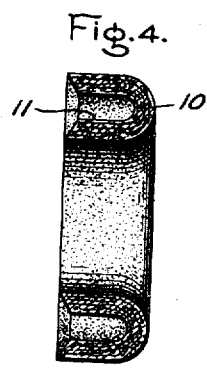
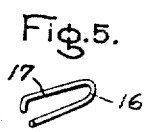
Inventor:
Charles F. Schwennker,
by Albert Davis
His Attorney.

Patented July 31, 1923.

1,463,488

UNITED STATES PATENT OFFICE.

CHARLES F. SCHWENNKER, OF SCHENECTADY, NEW YORK, ASSIGNOR TO GENERAL ELECTRIC COMPANY, A CORPORATION OF NEW YORK.

PACKING.

Application filed December 16, 1921. Serial No. 522,910.

*To all whom it may concern:*

Be it known that I, CHARLES F. SCHWENNKER, a citizen of the United States, residing at Schenectady, in the county of Schenectady, State of New York, have invented certain new and useful Improvements in Packings, of which the following is a specification.

The present invention relates to packings such as are used to prevent leakage between two relatively moving members, one application being in connection with a cylinder and piston to prevent leakage between them. It relates particularly to packings of the type comprising a flexible ring, such as a leather ring, which is U-shaped in cross section and is expanded by the pressure in the cylinder, such packings being ordinarily known as cup packings.

The object of my invention is to provide an improved structure and arrangement in a packing of this type, and for a consideration of what I believe to be novel and my invention, attention is directed to the accompanying specification and the claims appended thereto.

In the drawing, Fig. 1 is a sectional view of a cylinder and piston provided with a packing embodying my invention; Fig. 2 is a longitudinal sectional view of a holder; Fig. 3 is a face view of the holder shown in Fig. 2; Fig. 4 is a sectional view of a cup packing, and Fig. 5 is a perspective view of an expanding spring clip member.

Referring to the drawing, 5 indicates a cylinder and 6 a piston or other member which moves therein and between which and cylinder 5 it is desired to prevent leakage. The structure shown may be a part of an hydraulic press, for example, the high pressure side being on the left hand side of the drawing, the pressure acting in a direction toward the right as indicated by the arrows in Fig. 1. A rod 7 is connected to piston 6 and may be the element through which piston 6 is moved toward the left against the pressure. The left hand portion of cylinder 5 is broken away but it will be understood that it may comprise a suitably closed chamber to which fluid pressure is admitted by a pipe or other means. Connected to piston 6 is an extension 8 which is of less diameter than the piston and provides an annular shoulder 9 against which a packing may seat.

According to my invention, I provide a packing comprising an annular ring 10 of flexible material, preferably leather, which is U-shaped in cross section whereby an annular groove 11 is formed. This annular ring 10 is what is usually termed a cup packing and it is adapted to lie against shoulder 9 with its groove 11 facing in the direction of the pressure so that the pressure tends to expand the two sides of the packing against the wall of projection 8 and the wall of cylinder 5. Carried by projection 8 is a holder comprising a sleeve 12 of a diameter equal to that of projection 8 and an annular toothed portion 13 of a diameter such that it will fit groove 11 of packing member 10. Sleeve 12 is fastened to projection 8 in any suitable manner as by means of a cotter pin 14, the arrangement being such that the toothed portion of the holder lies in groove 11. The toothed portion of the holder may be formed by first providing a cylindrical member and then cutting spaced slots 15 therein, the slots being of a width suitable to receive spring clip expanding members 16 as shown in Fig. 5. Spring clip expanding members 16 may be made from spring wire and each comprises a U-shaped loop having an inturned finger 17 adapted to lie in a slot 15 to hold the clip member in place. They may be bent up from any suitable wire material. One of the spring clip expanding members 16 is arranged in each of the slots 15 and lie in groove 11 as best shown in Fig. 1. These spring clip members serve to expand packing member 10 against the adjacent side walls between which it is located, while the holder member serves to maintain the spring members in correct position. The fingers 17 of the clip members, since they lie in slots 15 keep the clip members from turning or twisting while the bottoms of the slots keep them from coming out from between the two sides of the packing member 10. With this arrangement the sides of the packing member 10 are always maintained in firm engagement with the surface of cylinder 5. This means that the packing member 10 cannot move from engagement with the cylinder wall when the pressure on it is relieved to a greater or lesser extent, while when the pressure on it is increased it can be forced by the pressure into very tight engagement with the wall.

Since the sides of packing member 10 are always maintained in firm engagement with the adjacent surfaces by the spring members, particularly at their outer edges, no particles of grease or water can work down between the packing and such adjacent surfaces when the pressure on the packing is relieved. This is a matter of great importance in maintaining a packing tight, particularly when packing against high pressures, for if particles of grease or water once get in between the sides of the cup packing and the walls, the packing cannot be expanded by the pressure into tight engagement with the adjacent walls and will leak. The arrangement also serves to cut down very materially the wear on the packing and to always maintain it tight. I have found that a packing of this character will give satisfactory service when used in connection with very high pressures and that the wear is negligible. The spring clip expanding members 16 may be made from phosphor bronze wire, for example, so that they will not disintegrate or shed any particles which may work down into the cylinder and cause abrasion.

The packing can be manufactured at a low cost and readily assembled.

By means of a multiplicity of spring clip expanding members I obtain the advantage that each clip acts independently in expanding the U-shaped packing member 7 and the expanding pressure is applied mostly at the outer ends of the two sides of the packing members where it is most useful and most needed. Furthermore, since the spring clip expanding members act independently of each other the packing member 10 will be forced outwardly uniformly throughout its entire circumference and the arrangement will take care of any inequalities in the ring itself.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A packing comprising a member, U-shaped in cross section and formed from flexible material such as leather, and a plurality of independent, spaced spring clip expanding members U-shaped in cross section located between the sides of the annular member.

2. A packing comprising a member, U-shaped in cross section and formed from flexible material such as leather, a plurality of independent spaced spring clip expanding members U-shaped in cross section located between the sides of the U-shaped member, and means for holding said spring members in spaced relation to each other.

3. A packing comprising a member U-shaped in cross section and formed from flexible material such as leather, a holder having a portion which lies between the two sides of the member and is provided with a series of spaced slots, and expanding members located in said slots.

4. A packing comprising a member U-shaped in cross section and formed from flexible material such as leather, a holder having a portion which lies between the two sides of the member, and spring means carried by the holder for expanding said annular member.

5. The combination with two relatively movable parts, of a packing for preventing leakage between them comprising a member U-shaped in cross section formed from flexible material such as leather, a holder carried by one of said parts, and spring means carried by the holder for expanding the sides of the U-shaped member.

6. The combination with a cylinder and a piston, one of which is provided with an annular seat, of a packing member U-shaped in cross section located on said seat, and a plurality of spaced, separately-formed spring members U-shaped in cross section located between the sides of the packing member to expand it.

7. The combination with a cylinder and a piston, one of which is provided with an annular seat, of a packing member U-shaped in cross section located on said seat, a holder, and a plurality of spaced, separately-formed spring members U-shaped in cross section carried by said holder, said spring members being located between the sides of the packing member to expand it.

In witness whereof I have hereunto set my hand this 15th day of December, 1921.

CHARLES F. SCHWENNKER.